United States Patent
Hoang et al.

(10) Patent No.: US 8,888,068 B2
(45) Date of Patent: Nov. 18, 2014

(54) SPLIT GATE VALVE WITH BIASING MECHANISM

(75) Inventors: Loc Gia Hoang, Houston, TX (US); S. Mark Svoboda, Singapore (SG)

(73) Assignee: Cameron International Corporation, Houston, TX (US)

( * ) Notice: Subject to any disclaimer, the term of this patent is extended or adjusted under 35 U.S.C. 154(b) by 340 days.

(21) Appl. No.: 13/298,261

(22) Filed: Nov. 16, 2011

(65) Prior Publication Data

US 2012/0286182 A1 Nov. 15, 2012

(30) Foreign Application Priority Data

May 9, 2011 (SG) .................................. 201103281

(51) Int. Cl.
  *F16K 25/00* (2006.01)
  *F16K 3/00* (2006.01)
  *F16K 3/02* (2006.01)
  *F16K 3/18* (2006.01)

(52) U.S. Cl.
  CPC ............... *F16K 3/0254* (2013.01); *F16K 3/186* (2013.01)
  USPC ........... 251/195; 251/167; 251/178; 251/203; 251/327

(58) Field of Classification Search
  CPC ..... F16K 3/029; F16K 3/0227; F16K 3/0236; F16K 3/16; F16K 3/18; F16K 3/186; F16K 3/20; F16K 3/205
  USPC ......... 251/167, 168, 195, 196, 197, 199, 202, 251/326, 327, 328, 169, 176, 178, 193, 194, 251/198, 203, 204
  See application file for complete search history.

(56) References Cited

U.S. PATENT DOCUMENTS

| | | | |
|---|---|---|---|
| 2,306,490 A * | 12/1942 | Noble | ........................... 251/176 |
| 3,586,034 A | 6/1971 | Karzeniowski | |
| 4,179,099 A | 12/1979 | Pierce, Jr. | |

(Continued)

FOREIGN PATENT DOCUMENTS

| | | |
|---|---|---|
| DE | 2627607 A1 | 1/1977 |
| EP | 1333207 A2 | 8/2003 |

(Continued)

OTHER PUBLICATIONS

PCT International Search Report; PCT/US2012/025826; Apr. 17, 2012; pp. 1-13.

(Continued)

*Primary Examiner* — John K Fristoe, Jr.
*Assistant Examiner* — Hailey K Do
(74) *Attorney, Agent, or Firm* — Fletcher Yoder P.C.

(57) ABSTRACT

A system includes a split gate valve with first and second gate sections coupled together and configured to move together within a cavity of the split gate valve between an open position and a closed position. The split gate valve includes a rolling actuator to reduce friction and to convert a rotational input into a linear motion to move the first and second gate sections between the open and closed positions. The split gate valve also includes at least one expansion bar configured to bias the first and second gate sections from one another to seal against opposite seats of the split gate valve, wherein each expansion bar includes a spring mechanism configured to compress upon moving the first and second gate sections into and beyond the closed position to prevent buckling of the expansion bar.

25 Claims, 8 Drawing Sheets

(56) References Cited

U.S. PATENT DOCUMENTS

| | | |
|---|---|---|
| 4,706,934 A | 11/1987 | Brown |
| 4,779,649 A | 10/1988 | Balter |
| 6,338,469 B1 | 1/2002 | Kalsi |
| 6,918,574 B2 * | 7/2005 | Hallden et al. .............. 251/327 |
| 7,523,916 B2 | 4/2009 | Fenton |
| 7,975,983 B2 * | 7/2011 | Comeaux et al. ............ 251/203 |
| 2008/0217569 A1 | 9/2008 | Holliday |
| 2009/0020719 A1 | 1/2009 | Ishigaki |

FOREIGN PATENT DOCUMENTS

| | | |
|---|---|---|
| FR | 2529640 A1 | 1/1984 |
| GB | 563896 A | 9/1944 |
| GB | 758253 A | 10/1956 |
| GB | 2447345 A | 10/2008 |
| WO | 0114775 A1 | 3/2001 |
| WO | 2009045140 A1 | 4/2009 |

OTHER PUBLICATIONS

Cameron's Surface System Publication #SW1997-092, 2006, 1-4.
Singapore Written Opinion & Search Report, dated May 8, 2013, SG201103281-0; 7 pages.
PCT International Search Report; PCT/US2011/061084; Jun. 5, 2012; pp. 1-21.
PCT Search Report, dated Mar. 6. 2012. PCT/US2011/061084; 7 pages.

* cited by examiner

SPLIT GATE VALVE WITH BIASING MECHANISM

CROSS REFERENCE TO RELATED APPLICATION

This application claims priority to and benefit of Singapore Patent Application No. 201103281-0, entitled "SPLIT GATE VALVE WITH BIASING MECHANISM", filed May 9, 2011, which is herein incorporated by reference in its entirety.

FIELD OF THE INVENTION

This invention relates to gate valves. More particularly, the present invention relates to a split gate valve employing a biasing mechanism.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gate valves are used in a wide variety of industries including oil and gas, power generation, food and beverage, water treatment, and the like. Gate valves include a gate that moves between an open and closed position to control the flow of fluid through the gate valve. In the open position, the gate's bore is aligned with the flow path, thereby allowing fluid to flow through the gate. To interrupt flow, the gate and, more importantly, the gate's bore is moved to the closed position, placing the gate's bore in an unaligned position with the flow path. Gate valves that have large bores (e.g., approximately 5 inches or greater) and/or that operate at higher pressures (e.g., approximately 10,000 psi or greater) generally seal only against one side of the gate. From time to time, operators of the gate may want to test the gate's seal from both sides. This testing can be more easily conducted if both sides of the gate valve are sealed. Unfortunately, sealing both sides of a large bore and/or high pressure gate valve often requires very high turning force to mechanically open and close the gate valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments discussed below include a system and method that addresses one or more of the above-mentioned inadequacies of a conventional large bore and/or high pressure gate valve. In certain embodiments, a system includes a split gate valve that includes a pair of gate sections (e.g., slab gates) coupled together and configured to move together within a cavity of the split gate valve between an open position and a closed position. The pair of gate sections allows the split gate valve to control flows of two different fluids with each gate section. In addition, the two gate sections allow the isolation of a fluid within a cavity of the split gate valve. The split gate valve also includes a rolling actuator (e.g., a ball screw or roller screw) configured to receive a rotational input (e.g., from a drive) and to convert the rotational input into linear motion to move the pair of gate sections between the open and closed positions. In some embodiments, the pair of split gate sections includes a biasing mechanism (e.g., one or more springs) to bias each gate section of the pair of the gate sections away from each other to form a double seal in the split gate valve. In certain embodiments, the split gate valve includes expansion bars to bias the pair of split gate sections away from each other to form the double seal in the split gate valve. For example, the pair of gate sections forms slots along a length of an interface between the pair of gate sections to engage the expansion bars as the pair of gate sections move from the open position to the closed position. In some embodiments, the expansion bar includes a spring mechanism configured to compress upon moving the pair of gate sections into and beyond the closed position to prevent buckling of the expansion bars. The formation of the double seal allows the filling of the cavity of the split gate valve to test each seal of the double seal at the same time. In certain embodiments, the split gate valve includes a body with an opening (e.g., generally rectangular opening) for the pair of gate sections configured for the insertion of the pair split gate sections and to closely fit the gate sections to minimize deflection.

Figure 1:
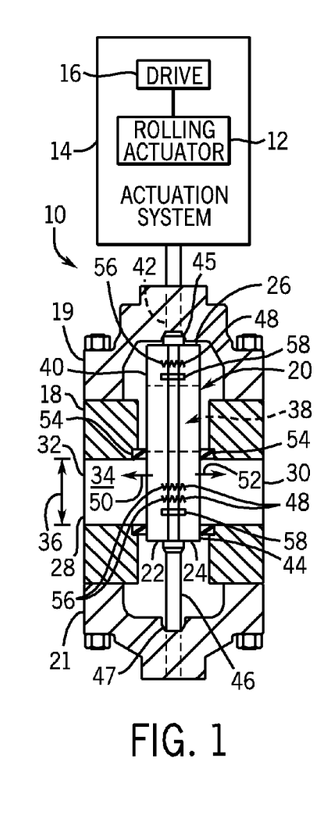
FIG. 1 is a schematic diagram of an embodiment of a split gate valve having a rolling actuator.

FIG. 1 illustrates an embodiment of a split gate valve 10 having a rolling actuator 12. Typically, the split gate design limits the use of the split gate valve 10 to valves 10 with smaller bores (e.g., less than approximately 5 inches in diameter) and/or lower pressure ratings (e.g., less than approximately 10,000 psi) due to the amount of force required to move the split gate in large bore and/or high pressure valves 10. However, the rolling actuator 12 enables the application of less mechanical force or torque to the split gate valve 10 to open and close the valve 10 (i.e., move the gate). Thus, the rolling actuator 12 enables the use of the split gate design with large bore and/or high pressure valves 10 or any other combination of bore size and operating pressure that would require the rolling actuator 12 to reduce the amount of mechanical force or torque needed to open and close the valve 10 (e.g., a smaller bore size with high operating pressure or a larger bore size with a low operating pressure).

The split gate valve 10 is generally configured to control a flow of fluid through the split gate valve 10 in various applications. For example, the split gate valve 10 may be employed in applications relating to oil and gas industries, power generation industries, petrochemical industries, and the like. For example, the split gate valve 10 may be coupled to a Christmas tree for petroleum and natural gas extraction. In some embodiments, the split gate valve 10 includes a large bore. For example, the bore of the split gate valve 10 may be at least approximately 5 inches in diameter. In other embodiments, the split gate valve 10 includes a smaller bore. For example, the bore of the split gate valve 10 may be less than approximately 5 inches. The diameter of the bore may range from approximately 3 to 20 inches, approximately 3 to 15 inches, approximately 3 to 10 inches, approximately 10 to 15 inches, or approximately 15 to 20 inches. For example, the bore may be approximately 3, 4, 5, 6, 7, 8, 9, 10, 11, 12, 13, 14, 15, 16, 17, 18, 19, 20 inches, or any other diameter. In certain embodiments, the split gate valve 10 is configured to operate at a high pressure of at least approximately 10,000 pounds per square inch (psi). In other embodiments, the split gate valve 10 is configured to operate at pressure lower than approximately 10,000 psi. For example, the split gate valve 10 may operate at pressures ranging from approximately 5,000 to 30,000 psi or more. By further example, the split gate valve 10 may operate at pressures ranging from approximately 5,000 to 25,000 psi, approximately 10,000 to 20,000 psi, approximately 5,000 to 10,000 psi, approximately 10,000 to 15,000 psi, approximately 15,000 to 30,000 psi, approximately 15,000 to 25,000 psi, approximately 20,000 to 30,000 psi, approximately 20,000 to 25,000 psi, or approximately 25,000 to 30,000 psi. In certain embodiments, the split gate valve 10 may include a bore (e.g., small bore size) of at least approximately 4 inches in diameter and be configured to operate at a pressure (e.g., high pressure) of at least approximately 10,000 psi. In other embodiments, the split gate valve 10 may include a bore (e.g., large bore size) of at least approximately 9 inches in diameter and be configured to operate at a pressure (e.g., low pressure) of at least 5,000 psi.

In the illustrated embodiment, the split gate valve 10 includes an actuation system 14 including a drive 16 and the rolling actuator 12. The actuation system 14 is coupled to a body 18 of the split gate valve 10. For example, the actuation system 14 may be coupled to a top portion of the body 18 via a bonnet 19. A bottom portion of the body 18 is also coupled to a bonnet 21. In certain embodiments, the split gate valve 10 may not include the bonnet 21 attached to the bottom portion of the body 18. Alternatively, split gate valve 10 may include a single body coupled to the actuation system 14. The body 18 may be constructed of cast iron, ductile iron, cast carbon steel, gun metal, stainless steel, alloy steels, corrosion resistant alloys, and/or forged steels. The split gate valve 10 includes a gate 20 (e.g., split gate) that include a pair of gate sections 22 and 24 disposed within a cavity 26 of the body 18, therein the gate sections 22 and 24 are configured to move between an open position and a closed position. As illustrated, the gate 20 is disposed in the closed position. In addition, as illustrated, each gate section 22 and 24 includes a rectangular cross-sectional profile. The body 18 of the split gate valve 10 includes an inlet 28 and an outlet 30 configured for a flow of a fluid through a bore 32 of the body 18 into a passage 34 of the split gate valve 10. In certain embodiments, the outlet 30 may act as an inlet allowing fluid flow into the cavity 26 from either side of the split gate valve 10. In some embodiments, the inlet 28 may act as an outlet and the outlet 30 may act as an inlet. As mentioned above, in certain embodiments, the bore 32 may include a diameter 36 of at least approximately 5 inches. For example, the diameter of the bore 32 may range from approximately 5 to 20 inches, approximately 5 to 15 inches, or approximately 5 to 10 inches, or approximately 10 to 15 inches. The passage 34 of the split gate valve 10 includes a passage 38 (indicated by dashes lines) through the gate 20 to allow flow through the split gate valve 10 from the inlet 28 to the outlet 30 when the gate 20 is in an open position (see FIGS. 2-4).

The split gate valve 10 is configured to open and close in response to an actuation force from the actuation system 14. In particular, the drive 16 is configured to provide a rotational input (e.g., rotational force or torque) to the rolling actuator. The drive 16 may be a manual drive or an automatic (e.g., powered) drive. For example, the drive 16 may include a handle or wheel configured to be rotated by an operator. By further example, the drive 16 may include a motor, such as an electric motor, a pneumatic motor, or a hydraulic motor. The rolling actuator 12 is configured to convert the rotational input received by the drive 16 into a linear motion (e.g., linear activation force) to move the gate 20 (i.e., the pair of gate sections 22 and 24) between open and closed positions. In certain embodiments, the rolling actuator 12 may include a ball screw or a rolling screw. The rolling actuator 12 is configured to reduce the amount of friction to operate the stem valve 10. In particular, the rolling actuator 12 reduces the amount of torque or force required to move the gate 20 within the split gate valve 10. The rolling actuator 12 is coupled to a top portion 40 of the gate 20 via a stem 42 (e.g., an operating stem) configured to facilitate the movement of the gate 20 between the open and closed positions. A bottom portion 44 of the gate 20 is also coupled to a stem 46 (e.g., a balancing stem). The stems 42 and 46 move along bores 45 and 47 of bonnets 19 and 21, respectively. In certain embodiments, where the split gate valve 18 includes a single body 18, the stems 42 and 46 may move along bores of the single body 18. Each of the stems 42 and 46 may be connected to both gate sections 22 and 24 via connectors. For example, both the top portions 40 and the bottom portions 44 of the gate sections 22 and 24 may form cavities to surround a T-connecter (see FIG. 5) located at the end of each of the stems 42 and 46 near to the gate 20.

As mentioned above, the gate 20 includes the pair of gate sections 22 and 24 (e.g., slab sections). The split gate arrangement of the gate 20 includes advantages over a single gate arrangement. For example, two different fluids on different sides of the split gate valve 10 may be separated from each other by the pair of gate sections 22 and 24. Also, a fluid may be pumped into the cavity 26 of the split gate valve 10 for isolation. For example, the cavity 26 may be filled with a fluid (e.g., liquid or gas) to further bias each gate section 22 and 24 away from each other to form seals. In addition, as mentioned above, fluid may be pumped into the cavity 26 from both sides of the split gate valve 10. Further, each gate section 22 and 24 may be constructed of a different material suitable for the fluid on its respective side of the split gate valve 10. For example, the material may be corrosion resistant, wear resistant, and/or chemical resistant. The gate sections 22 and 24 may be constructed of cast carbon steel, gun metal, stainless steel, alloy steels, corrosion resistant alloys, and/or forged steels. Also, as discussed in greater detail below, gate sections 22 and 24 form a double seal which allows the testing of each seal at the same time (i.e., simultaneously).

As to the details of the split gate arrangement of the gate 20, the pair of gate sections 22 and 24 include a biasing mechanism 48 disposed between them. The biasing mechanism 48 is configured to bias the gate sections 22 and 24 away from each other in directions 50 and 52, respectively. Each gate section 22 and 24 is biased against a seat 54 (e.g., annular seat) of the body 18 of the split gate valve 10 to form a double seal (i.e., a seal on each side of the valve 10). The seat 54 may be constructed of ceramic, cast iron, ductile iron, cast carbon steel, gun metal, stainless steel, alloy steels, corrosion resistant alloys, and/or forged steels. As illustrated, the biasing mechanism 48 includes a spring 56. In other embodiments, the biasing mechanism 48 may include a cam mechanism or an elastic material. The formation of a seal by each gate section 22 and 24 allows seal testing for each gate face (i.e., the inlet 28 and outlet 30 sides) to occur at a valve rated working pressure during the introduction of a test pressure into the cavity 26 of the seat valve 10.

The pair of gate sections 22 and 24 also includes a coupling mechanism 58 to couple the gate sections 22 and 24 together. Due to the coupling mechanism 58, the gate sections 22 and 24 are configured to move together within the cavity 26 of the split gate valve 10 between the open and closed positions. In particular, in response to a rotational input provided by the drive 16, the rolling actuator 12 converts the rotational input into a linear motion that jointly moves the coupled gate sections 22 and 24 between the open and closed positions. In certain embodiments, the coupling mechanism 58 may include a pin extending into slots with each gate section 22 and 24. The coupling mechanism 58 guides the movement of the gate sections 22 and 24 away and toward one another. In particular, the coupling mechanism 58 guides movement of the gate sections 22 and 24 towards the seat 54 in response to biasing force of biasing mechanism 48 (e.g., spring). The split gate valve 10 as described above allows rolling friction (via the rolling actuator 12) to reduce the work required to mechanically operate the valve 10, in particular, large bore and/or high pressure gate valves 10.

Figure 2:
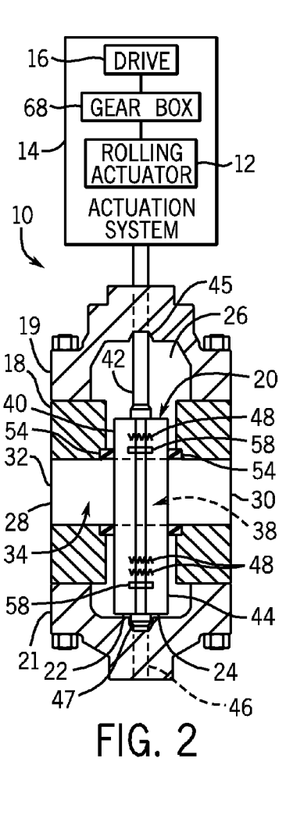
FIG. 2 is a schematic diagram of another embodiment of the split gate valve having the rolling actuator.

FIG. 2 illustrates an embodiment of the split gate valve 10 in an open position. As illustrated, the passage 38 through the gate 20 (i.e., gate sections 22 and 24) is aligned with the bore 32 of the inlet 28 and the outlet 30 to form the passage 34 through the split gate valve 10. The split gate valve 10 is as described in FIG. 1 except for an added gear box 68 in the actuation system 14. The gear box 68 is disposed between the drive 16 and the rolling actuator 12. The gear box 68 is configured to reduce the amount of rotational torque used to move the gate 20 (i.e., gate sections 22 and 24) between the open and closed positions. For example, the gear box 68 may include internal gearing coupled to the drive 16. For example, the internal gearing may include gear ratios ranging from 4:1 to 20:1. As described above, the rolling actuator 12 converts the rotational input from the drive 16 and the gear box 68 into a linear motion to move the pair of gate sections 22 and 24 between open and closed positions. The split gate valve 10 as described allows rolling friction (via the rolling actuator 12) to reduce the work required to mechanically operate the valve 10, in particular, large bore and/or high pressure gate valves 10.

Figure 3:
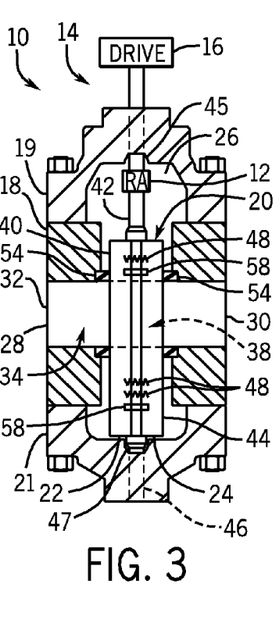
FIG. 3 is a schematic diagram of an embodiment of the split gate valve having the rolling actuator disposed within a cavity of the split gate valve.
Figure 4:
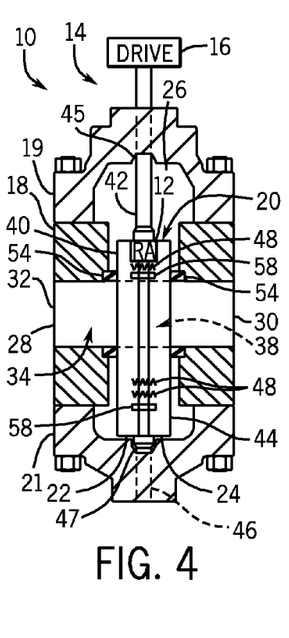
FIG. 4 is a schematic diagram of an embodiment of the split gate valve having the rolling actuator disposed between a pair of gate sections within the cavity of the split gate valve.

FIGS. 3 and 4 illustrate embodiments of the actuation system 14 of the split gate valve 10. The split gate valve 10 is as described in FIG. 1 except that the rolling actuator 12 is disposed within the cavity 26 of the split gate valve 10. The rolling actuator 12 may be disposed within the cavity 26 of the split gate valve 10 when the environment within the cavity 26 is suitable for the actuator 12. In embodiment of FIG. 3, the rolling actuator 12 is disposed within the cavity 26 coupled to the stem 42 (e.g., the operating stem) outside of the gate sections 22 and 24. In the embodiment of FIG. 4, the rolling actuator 12 is disposed within the cavity 26 coupled to the stem 42 between the gate sections 22 and 24. In the embodiments of both FIGS. 3 and 4, as above, the rolling actuator 12 converts the rotational input from the drive 16 into a linear motion to move the pair of gate sections 22 and 24 between open and closed positions. The split gate valve 10 as described allows rolling friction (via the rolling actuator 12) to reduce the work required to mechanically operate the valve 10, in particular, large bore and/or high pressure gate valves 10.

Figures 5, 6:
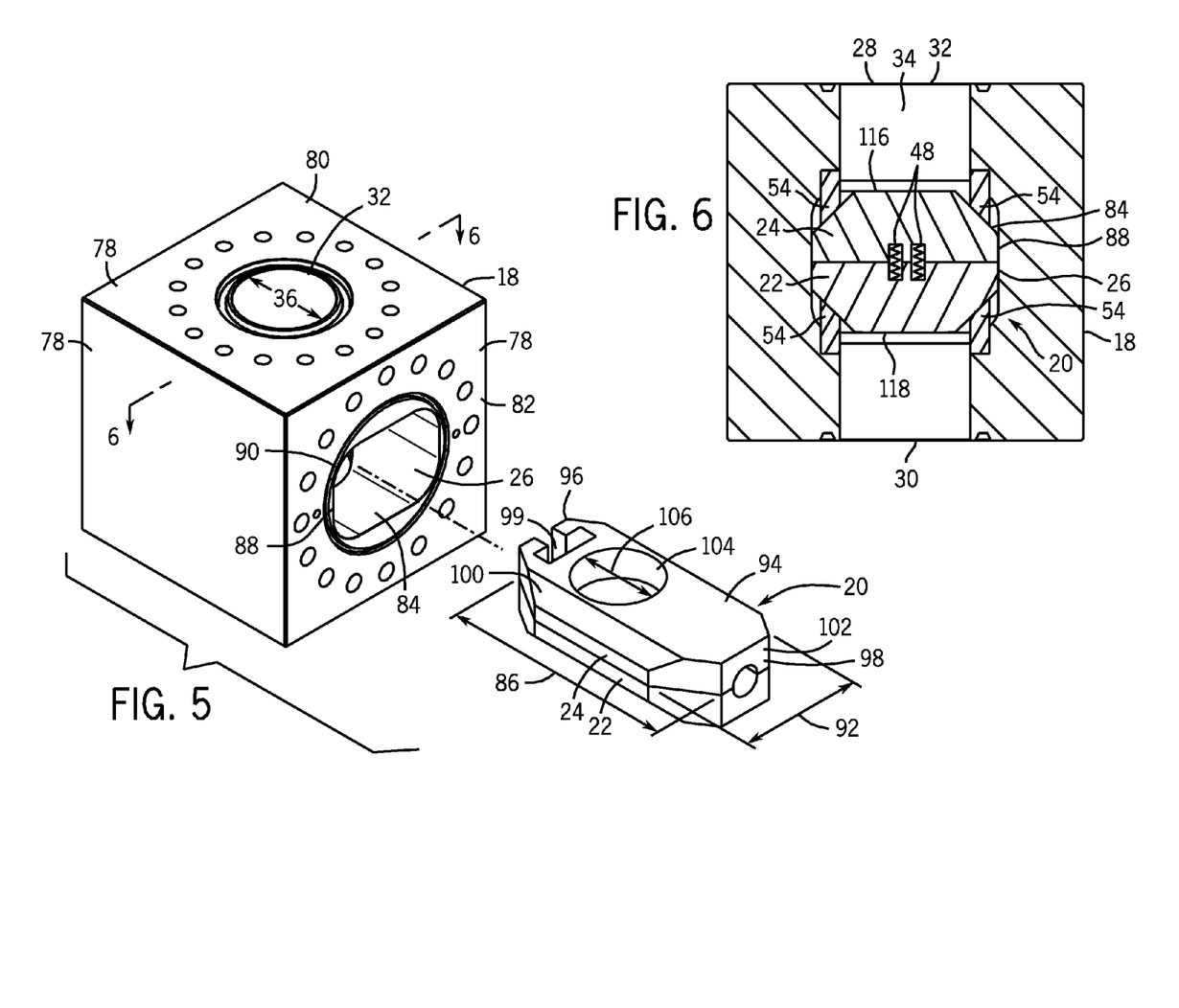
FIG. 5 is an exploded perspective view of an embodiment of a body of the split gate valve and the pair of gate sections.
FIG. 6 is cross-sectional view of an embodiment of the body of the split gate valve with the pair of gate sections inserted within the body, taken along line 6-6 of FIG. 5.

FIG. 5 illustrates a perspective view of an embodiment of both the body 18 and the gate sections 22 and 24 for the split gate valve 10. As illustrated, the body 18 includes a cuboidal shape with a plurality of faces 78 (e.g., six). For example, the body 18 may be shaped as a right cuboid, a rectangular box, a rectangular hexahedron, a right rectangular prism, square cuboid, square box, or right square prism. Alternatively, the body 18 may include a circular, oval, or oblong shape. As illustrated, the body 18 includes a pair of opposite faces 78 (e.g., face 80) including large bores 32 for the passage of fluid through the split gate valve 10. In certain embodiments, the bore 32 includes diameter 36 that may be at least approximately 5 inches in diameter. In some embodiments, the bore 32 includes diameter 36 that may be less than approximately 5 inches. The diameter 36 may range from approximately 3 to 20 inches, approximately 3 to 15 inches, or approximately 3 to 10 inches, or approximately 10 to 15 inches, or approximately 15 to 20 inches. For example, the diameter 36 may be 3, 4, 5, 6, 7, 8, 9, 10, 11, 12, 13, 14, 15, 16, 17, 18, 19, 20 inches, or any other diameter therebetween.

In addition, the body 18 includes a pair of opposite faces 78 (e.g., face 82) that each includes an opening 84 configured for the insertion of the pair of gate sections 22 and 24 along a length 86 of the gate sections 22 and 24. As illustrated, the opening 84 includes a rectangular perimeter 88 with rounded corners 90. In other embodiments, the perimeter 88 of the opening 84 may be rectangular with right-angled corners 90, square with rounded corners 90, or square with right-angled corners 90. Alternatively, the perimeter 88 of the opening 84 may be circular, round, oval, or oblong. In particular, the perimeters 88 of the opening 84 and the cavity 26 of the body 18 are configured to closely fit around the gate 20 when the gate 20 is inserted within the body 18. Thus, cavity 26 of the body 18 is configured to allow the gate 20 to consume nearly all of the space within the cavity 26. In particular, gate 20 engages substantially the entire cavity 26. Tightly fitting the cavity 26 of the body 18 to the gate 20 allows the reduction in size of the body 18 (i.e., reduction in material) minimizing the amount of deflection experienced by the split gate valve 10 under load pressure. In addition, using the generally rectangular opening 84 adds more material between the gate 20 and the body 18 (e.g., thicker walls) to increase the strength and rigidity of the body 18 as opposed to a circular opening. In other words, the rectangular opening 84 allows thicker walls surrounding the gate 20 that otherwise would be cut away with a circular opening. However, as mentioned above, the opening 84 may be circular, round, oval, or oblong as long as the shape meets the design criteria for the split gate valve 10 such as fitting the gate 20 and the seat 54.

The shape of the perimeter 88 of the opening 84 and the cavity 26 depends on a cross-sectional area of the gate 20 along a width 92 of the gate 20. As illustrated, each gate section 22 and 24 includes a main body 94 with a generally rectangular shape along the length 86 of the sections 22 and 24. In addition, each gate section 22 and 24 includes ends 96 and 98 and sides 100 and 102 that taper away from the main body 94. In certain embodiments, each gate section 22 and 24 may include flat ends 96 and 98 and flat sides 100 and 102. End 96 forms a cavity 99 to surround a T-connector located at the end of the stem 42. End 98 also forms a cavity (not shown) to surround a connector (e.g., T-connector) located at the end of the stem 44. Further, each gate section 22 and 24 includes an opening 104, defining passage 38 through the gate 20, configured to allow the flow of fluid through the gate 20 when the gate 20 is aligned with the bore 32 of the body 18. In some embodiments, the opening 104 of each gate section 22 and 24 may include a diameter 106 equivalent to the diameter 36 of the bore 32 of the body 18. In other embodiments, the diameter 105 of the opening 104 of each gate section 22 and 24 may be smaller than the diameter 36 of the bore 32 of the body 18.

FIG. 6 illustrates the close fit between the body 18 and the gate 20 upon insertion of the gate 20 into the body 18. In particular, FIG. 6 is a cross-sectional view of the body 18 disposed about the gate 20 taken along line 6-6 of FIG. 5. The body 18 and the gate 20 are as described in FIGS. 1 and 5. In particular, the gate sections 22 and 24 are inserted within the opening 84 into the cavity 26 of body 18 with the length of 86 of the gate 20 crosswise (i.e. perpendicular) to the flow into passage 34 through the inlet 28 and outlet 30 of the body 18. The perimeter 88 of the cavity 26 and the opening 84 closely fit around both gate sections 22 and 24, thus, the gate 20 takes up most of the space within the cavity 26 of the body 18. In addition, as described above, the gate sections 22 and 24 may include at least one biasing mechanism 48 disposed between them to bias each gate section 22 and 24 away from each other to form a double seal (e.g., seals 116 and 118) with the seat 54 of the body 18.

Figures 7, 8:
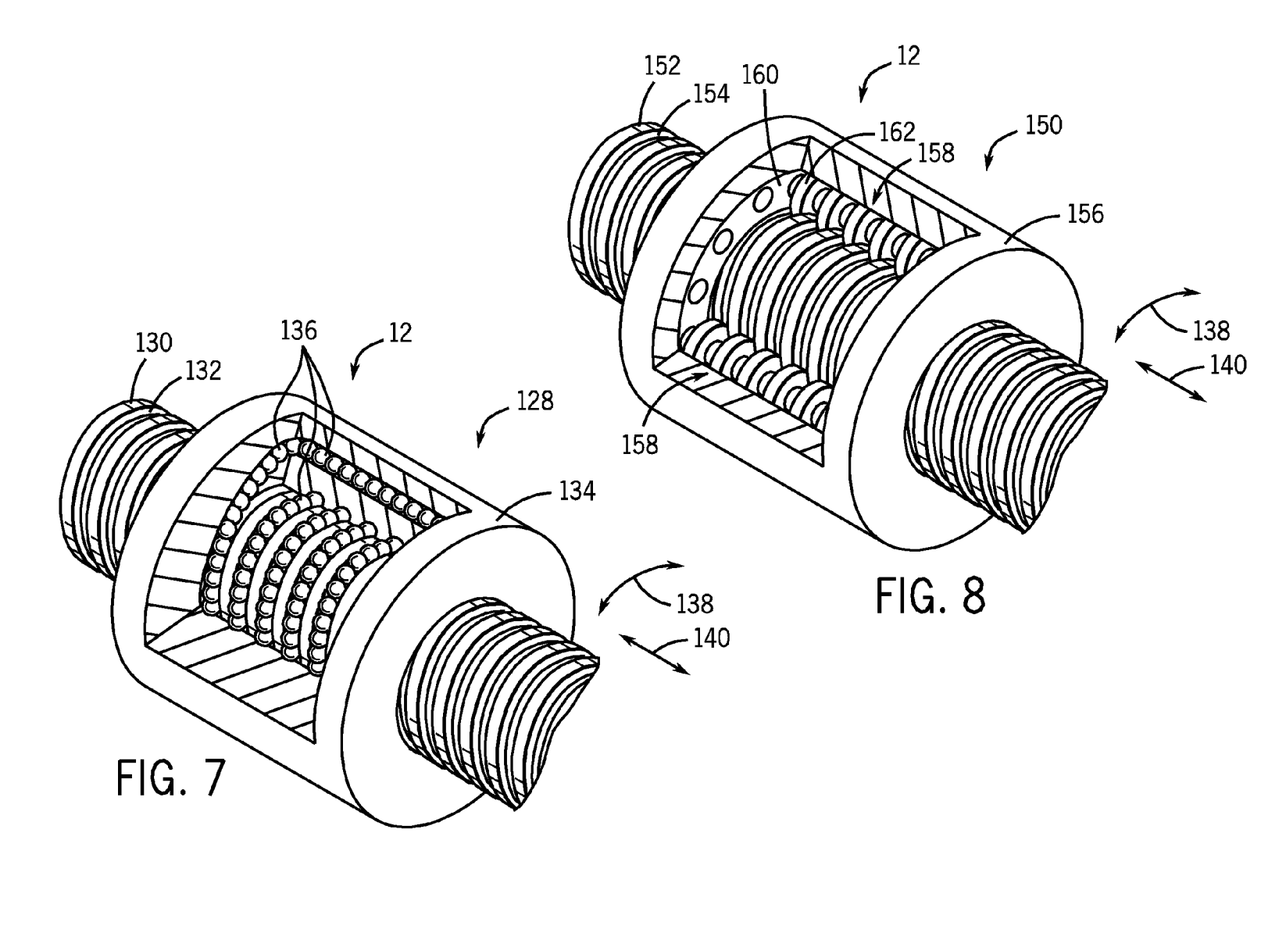
FIG. 7 is a perspective cutaway view of an embodiment of a ball screw for use as the rolling actuator.
FIG. 8 is a perspective cutaway view of an embodiment of a roller screw for use as the rolling actuator.

As mentioned above, these embodiments of the body 18 and gate 20 are employed with the actuation system 14 that includes the rolling actuator 12 to reduce the work required to mechanically operate the valve 10 (via rolling friction), in particular, large bore and/or high pressure gate valves 10. FIGS. 7 and 8 illustrate some, but not all, of the embodiments of the rolling actuator 12. FIG. 7 illustrates an embodiment of the rolling actuator 12 that includes a ball screw 128. Although FIG. 7 illustrates one embodiment of the ball screw 128, the ball screw 128 may include any type of ball screw mechanism. The ball screw 128 may be a part of or separate from the stem 42 (e.g., the operating stem) of the split gate valve 10. The illustrated ball screw 128 includes a screw shaft 130 including helical grooves 132 and a nut 134 including a plurality of ball bearings 136. The helical grooves 132 provide a pathway for the ball bearings 136 to travel along as the nut 134 receives a rotational input as indicated by arrow 138. The ball screw 128 may include a recirculation mechanism to recirculate the ball bearings 136 into the helical grooves 132. The ball screw 128 is configured to convert the rotational input 138 into a linear motion as indicated by arrow 140, while minimizing friction to provide a high mechanical efficiency. The ball screw 128 may be constructed of chrome steel, stainless steel, and/or alloy steels. The ball bearings 136 may be constructed of chrome steel, stainless steels, alloy steels, and/or ceramic.

Alternatively, FIG. 8 illustrates the rolling actuator 12 including a roller screw 150. Although FIG. 8 illustrates one embodiment of the roller screw 150, the roller screw 150 may include any type of roller screw mechanism. For example, the roller screw 150 may include a planetary roller screw, an inverted roller screw, a recirculating roller screw, or a bearing ring roller screw. The roller screw 150 may be part of or separate from the stem 42 (e.g., the operating stem) of the split gate valve 10. The roller screw 150 includes a screw shaft 152 including helical grooves 154 and a nut 156 including a plurality of rollers 158 disposed between opposite rings (e.g., ring 160). Each roller 158 may be threaded (e.g., threads 162) or grooved. The helical grooves 154 provide a pathway for the threaded or grooved rollers 158 to travel along as the nut 156 receives a rotational input as indicated by arrow 138. The roller screw 150 is configured to convert the rotational input 138 into a linear motion as indicated by arrow 140, while minimizing friction to provide a high mechanical efficiency. The roller screw 150 may be constructed of chrome steel, stainless steel, and/or alloy steels. As mentioned above, the rolling actuator 12 (e.g., the ball screw 128 or the roller screw 150) is configured to reduce friction and to covert rotational input (e.g., received by the drive 16) into linear motion to move the pair of gate sections 22 and 24 between the open and closed positions within the split gate valve 10. Thus, the rolling actuator 12 reduces the work required to mechanically operate the split gate valve 10, in particular, large bore and/or high pressure gate valves 10.

As discussed in detail above, the biasing mechanism 48 (e.g., spring) is disposed between the pair of gate sections 22 and 24 in a relatively central location, e.g., between lateral sides. However, the biasing mechanism 48 may be disposed at any location suitable to bias the gate sections 22 and 24 away from one another. Furthermore, the biasing mechanism 48 may include any biasing structure suitable to impart an expanding biasing force, e.g., opposite outward force, to force the gate sections 22 and 24 away from one another. For example, as discussed in detail below with reference to FIGS. 9-23, the biasing mechanism may include a wedge-like structure, a cam mechanism, or the like, to gradually expand the gate sections 22 and 24 apart. In certain embodiments, the biasing mechanism may include an expansion bar, such as a wedge bar or tapered structure, with one or more spring elements. Accordingly, the expansion bar may be described as a spring bar, a spring-equipped expansion bar, or an integral spring wedge bar. As discussed below, the spring elements may be configured to absorb any overextension or overstroking of the gate sections 22 and 24, thereby preventing buckling or permanent deformation of the gate sections 22 and 24.

As illustrated in FIGS. 9-23, the split gate valve 10 includes one or more expansion bars 168 (e.g., a pair of expansion bars 168) to bias the gate sections 22 and 24 away from one another toward opposite seats 54 of the split gate valve 10. As the gate sections 22 and 24 are energized by the expansion bars 168 to expand or diverge away from one another, the gate sections 22 and 24 interface with the opposite seats 54 to seal both gate sections 22 and 24 with the body 18 of the split gate valve 10. In the embodiments discussed below, the expansion bars 168 are disposed in slots along opposite lateral sides of the gate sections 22 and 24. However, the expansion bars 168 may be disposed in any suitable location to expand the gate sections 22 and 24. In addition, the expansion bars 168 include biasing mechanisms, which are described in greater detail below, to prevent the expansion bars 168 from buckling or permanently deforming due to overstroking of the split gate valve 10. For example, embodiments of the expansion bars 168 include integral spring mechanisms, such as longitudinal grooves, crosswise slots or notches, and/or orifices, which are compressible in one or more directions (e.g., lengthwise and/or crosswise directions). This compressibility of the integral spring mechanisms enables the expansion bars 168 to absorb any overextension or overstroking of the gate sections 22 and 24 beyond the closed position of the split gate valve 10.

Figure 9:
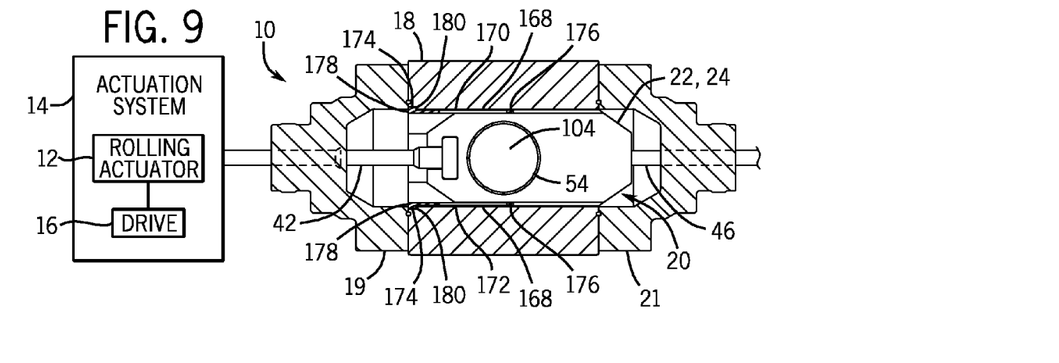
FIG. 9 is a schematic diagram of an embodiment of the split gate valve having expansion bars with the pair of gate sections in an open position.
Figure 10:
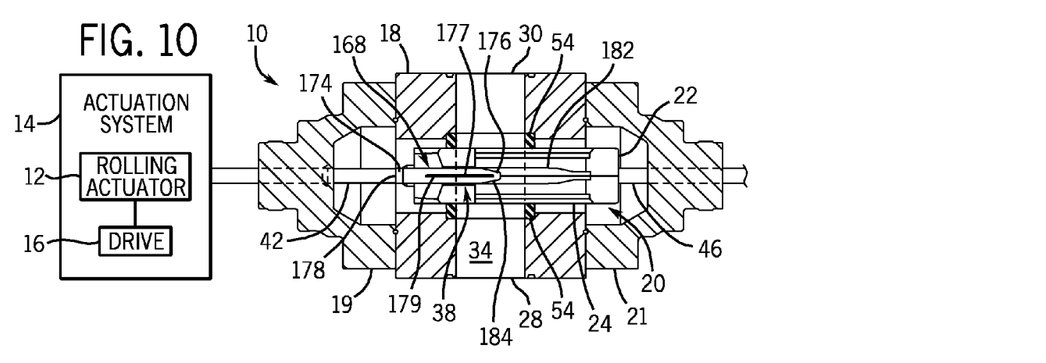
FIG. 10 is a schematic diagram of an embodiment of the split gate valve having the expansion bars with the pair of gate sections in the open position.

FIGS. 9 and 10 are schematic diagrams of different views of an embodiment of the split gate valve 10 having expansion bars 168 (e.g., first expansion bar 170 and second expansion bar 172) with the pair of gate sections 22 and 24 in the open position. FIG. 9 illustrates a front view of the gate 20 and FIG. 10 illustrates a side view of the gate 20. The split gate valve 10, which is described above, includes the actuation system 14 as described above. In addition, the structure of the split gate valve 10 is as described above. The expansion bars 168 are configured to bias the gate sections 22 and 24 away from one another to seal against the opposite seats 54 of the split gate valve 10 as the pair of gate sections 22 and 24 moves from the open position to the closed position. Each expansion bar 168 includes a first end 174, a second end 176, and a spring mechanism 177 disposed along a portion of a length of the expansion bar 168 between the first and second ends 174 and 176. The spring mechanism 177 is configured to compress upon movement of the pair of gate sections 22 and 24 into and beyond the closed position (e.g., absorbing any compression caused by overextension or overstroking) to prevent buckling of the expansion bar 168. As illustrated, the spring mechanism 177 includes a groove 179 configured to compress upon movement of the pair of gate sections 22 and 24 into and beyond the closed position to prevent buckling of the expansion bar 168. In certain embodiments, each expansion bar 168 may include more than one spring mechanism 177 as described in greater detail below.

The first end 174 includes a protruding end 178 configured to engage the body 18 of the split gate valve 10 to maintain the expansion bar 168 in a stationary position relative to the pair of gate sections 22 and 24. As illustrated, the protruding end 178 includes a lip that rests on a retention recess 180 (e.g., slot) of the body 18. In certain embodiments, the protruding end 178 may include different shapes as described in greater detail below. The bonnet 19 secured to the body 18 holds the expansion bars 168 in place. Alternatively, the expansion bars 168 may be secured to any stationary part (e.g., body 18 or bonnet 19) of the split gate valve 10 via a pin, bolt, or weld.

As illustrated in FIG. 10, the pair of gate sections 22 and 24 form a slot 182 (e.g., slot sections 181 and 183) along the longitudinal interface between the gate sections 22 and 24 on each lateral side of the gate sections 22 and 24. Collectively, each pair of slot sections 181 and 183 of the respective gate sections 22 and 24 define a respective slot 182. Each slot 182 is configured to engage a respective expansion bar 168 as the pair of gate sections 22 and 24 move from the open position to the closed position. Each expansion bar 168 is configured to form an interference fit or wedge fit with each slot 182 upon moving the pair of gate sections 22 and 24 into the closed position as described in greater detail below. In particular, the second end 176 of each expansion bar 168 includes a tapered end 184 configured to engage the slot 182 as the pair of gate sections 22 are moved from the open position to the closed position, and to bias the gate sections 22 and 24 away from one another as the tapered end 184 gradually expands the slot 182.

Figure 11:
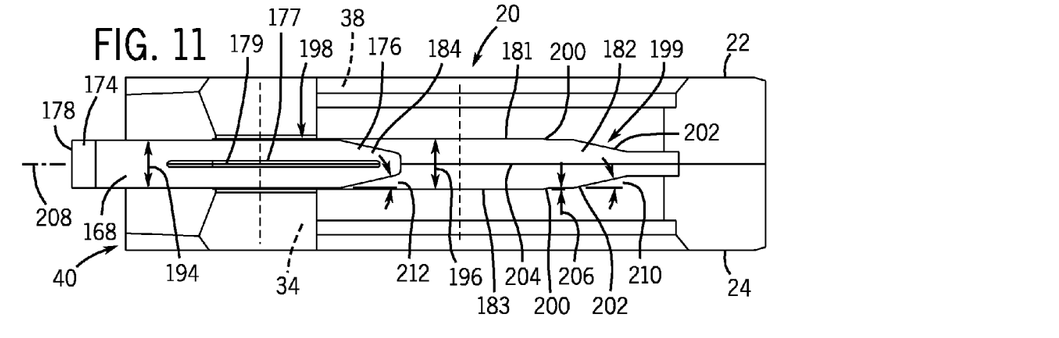
FIG. 11 is a close-up schematic diagram of an embodiment of the split gate valve of FIGS. 9 and 10, illustrating an expansion bar disposed along a slot in the pair of gate sections.

FIG. 11 is a close-up schematic diagram of an embodiment of one of the expansion bars 168 and the pair of gate sections 22 and 24 of the split gate valve 10 of FIGS. 9 and 10. The expansion bar 168 and slot 182 are as described above in FIGS. 9 and 10. Again, each slot 182 is defined by slot sections 181 and 183 in the respective gate sections 22 and 24. As illustrated, a width 194 of the expansion bar 168 is initially less than a width 196 of the slot 182 while the gate sections 22 and 24 are in an open position. Thus, in the open position, the gate sections 22 and 24 more easily move along the expansion bar 168, which is not yet biasing the gate sections 22 and 24 apart from one another. For example, the difference in widths 194 and 196 may provide a small clearance to reduce friction, and improve movement, of the gate sections 22 and 24 relative to the expansion bar 168. However, as the gate sections 22 and 24 move toward the closed position, the expansion bar 168 gradually fills and expands the width 196 of the slot 182 (e.g., in a wedge-like manner) to create a biasing force to spread apart the gate sections 22 and 24. For example, upon engagement between the tapered end 184 of the expansion bar 168 and the slot 182, the tapered end 184 gradually wedges, expands, or spreads the gate sections 22 and 24 apart (i.e., in opposite diverging directions) from one another. The width 194 of the expansion bar 168 is uniform from the first end 174 toward the second end 176 of the expansion bar 168, where the width 194 begins to narrow forming the tapered end 184 of the expansion bar 168.

Similarly, the slot 182 includes a first slot portion 198 with a uniform width 196 and a second slot portion 199 that tapers or converges. For example, the second slot portion 199 includes first and second portions 200 and 202 that taper or converge toward an interface 204 between the pair of gate sections 22 and 24. In addition, the first and second portions 200 and 202 taper or converge in a direction from the top portion 40 to the bottom portion 44 of the gate sections 22 and 24. For example, the first portion 200 includes a first angle 206 relative to a longitudinal axis 208 of the expansion bar 168 and the gate 20. The first angle 206 may range from approximately 0 to 40 degrees, 10 to 30 degrees, 15 to 25 degrees, or 10 to 20 degrees. For example, the first angle 206 may be approximately 5, 10, 15, 20, 25, 30, 35, or 40 degrees, or any other angle therebetween. The second portion 202 includes a second angle 210 relative to the longitudinal axis 208 of the expansion bar 168 and the gate 20. The second angle 210 may range from approximately 0 to 40 degrees, 10 to 30 degrees, 15 to 25 degrees, or 10 to 20 degrees. For example, the second angle 210 may be approximately 5, 10, 15, 20, 25, 30, 35, or 40 degrees, or any other angle therebetween. In certain embodiments, the first and seconds angles 206 and 210 are the same. In some embodiments, the first and second angles 206 and 210 are different from each other. The first and second angles 206 and 210 are configured to control the rate of expanding the gate sections 22 and 24 away from one another as the gate sections 22 and 24 move lengthwise along the expansion bars 168. Therefore, different angles 206 and 210 provide different rates for expanding the gate sections 22 and 24 away from one another. In certain embodiments, the first and second portions 200 and 202 of the slot 182 may be curved to provide a continuously variable rate of expanding the gate sections 22 and 24.

As mentioned above, the second end 176 of the expansion bar 168 includes the tapered end 184 configured to engage the slot 182 as the pair of gate sections 22 and 24 move from the open position to the closed position and to bias the gate sections 22 and 24 away from one another as the tapered end 184 engages the slot 184. In particular, the tapered end 184 of the expansion bar 168 is configured to wedgingly engage the first and second portions 200 and 202 of the slot 182 to form an interference fit between the expansion bar 168 and the slot 182 and to bias the gate sections 22 and 24 away from one another. Specifically, tapered end 184 may taper at an angle 212 relative to the axis 208, thereby enabling the tapered end 184 to form an interference fit or wedge fit with the first and second portions 200 and 202 and bias the gate sections 22 and 24 away from one another. The angle 212 may range from approximately 5 to 40 degrees, 10 to 30 degrees, 15 to 25 degrees, or 10 to 20 degrees. For example, the angle 212 may be approximately 5, 10, 15, 20, 25, 30, 35, or 40 degrees, or any other angle therebetween. In certain embodiments, the angle 212 of the tapered end 184 may be the same as angles 206 and 210 of the slot 182. In some embodiments, the angle 212 may be different from angles 206 and 210 of the slot 182. For example, the angle 212 may be greater or less than the angle 206 and/or 210 of the slot 182. In one embodiment, the angle 210 may be greater than the angle 206, while the angle 212 may be greater than, less than, or equal to either the angle 206 or the angle 210. In another embodiment, the angle 210 may be less than the angle 206, while the angle 212 may be greater than, less than, or equal to either the angle 206 or the angle 210. As illustrated, the gate sections 22 and 24 are located in the open position. In the open position, the expansion bar 168 does not wedgingly engage the slot 182 to bias the gate sections 22 and 24 away from one another.

Figure 12:
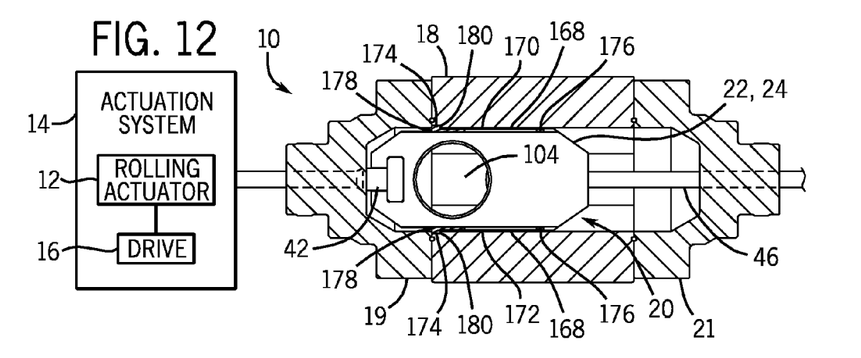
FIG. 12 is a schematic diagram of an embodiment of the split gate valve having expansion bars with the pair of gate sections in a closed position.
Figure 13:
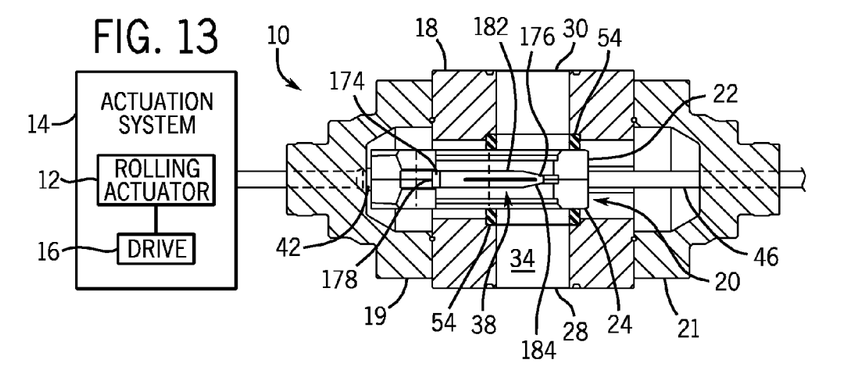
FIG. 13 is a schematic diagram of an embodiment of the split gate valve having the expansion bars with the pair of gate sections in the closed position.

FIGS. 12 and 13 are schematic diagrams of different views of an embodiment of the split gate valve 10 having expansion bars 168 (e.g., first expansion bar 170 and second expansion bar 172) with the pair of gate sections 22 and 24 in the closed position. FIG. 12 illustrates a front view of the gate 20 and FIG. 13 illustrates a side view of the gate 20. The split gate valve 10 in FIGS. 12 and 13 is as described in FIGS. 9-11 except the gate 20 is positioned in the closed position. As mentioned above, the expansion bars 168 remain in a stationary position, while the gate sections 22 and 24 move relative to the expansion bars 168. As illustrated in FIG. 13, the tapered end 184 of the expansion bar 168 wedgingly engages the slot 182 formed by the pair of gate sections 22 and 24 to form an interference fit and bias the gate sections 22 and 24 away from each other to seal against opposite seats 54 of the split gate valve 10.

Figure 14:
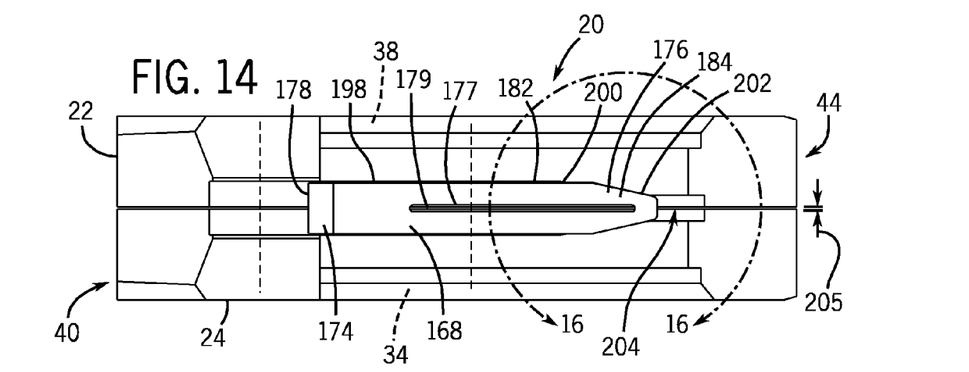
FIG. 14 is a close-up schematic diagram of an embodiment of the split gate valve of FIGS. 12 and 13, illustrating an expansion bar disposed along a slot in the pair of gate sections.

FIG. 14 is a close-up schematic diagram of an embodiment of one of the expansion bars 168 and the pair of gate sections 22 and 24 of the split gate valve 10 of FIGS. 13 and 14. The expansion bar 168 and slot 182 are as described above in FIGS. 9-11. As illustrated, the tapered end 184 of the expansion bar 168 forms an interference fit or wedge fit with the slot 182 to bias the gate sections 22 and 24 away from each other. In particular, with the gate 20 in the closed position, the tapered end 184 wedgingly engages both the first portion 200 and second portion 202 of the slot 182 as described in greater detail below. In certain embodiments, the expansion bar 168 may bias the gate sections 22 and 24 approximately 1 to 200 mils (25.4 to 5,080 microns), 5 to 90 mils (127 to 2,286 microns), or 10 to 50 mils (254 to 1,270 microns) away from each other, as indicated by gap 205. However, the expansion bars 168 may bias the gate sections 22 and 24 apart by any gap 205 to provide positive sealing with the seats 54.

Figure 15:
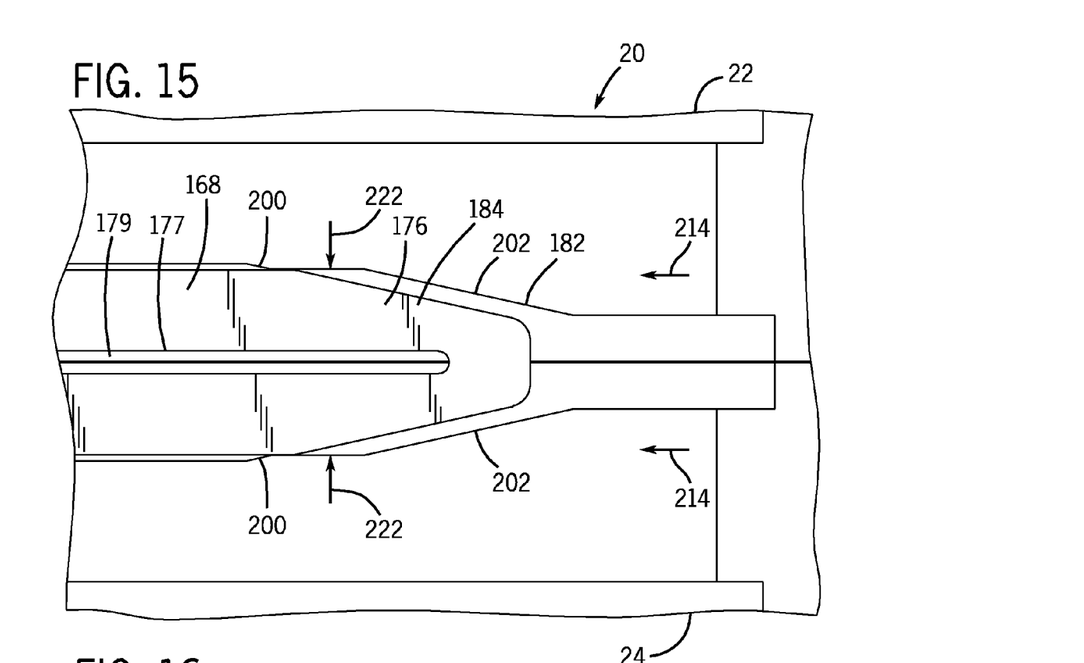
FIG. 15 is a schematic diagram of an embodiment of the split gate valve of FIG. 14, illustrating the expansion bar engaging a first portion of a slot along the pair of gate sections as the pair of gate sections move toward a closed position.
Figure 16:
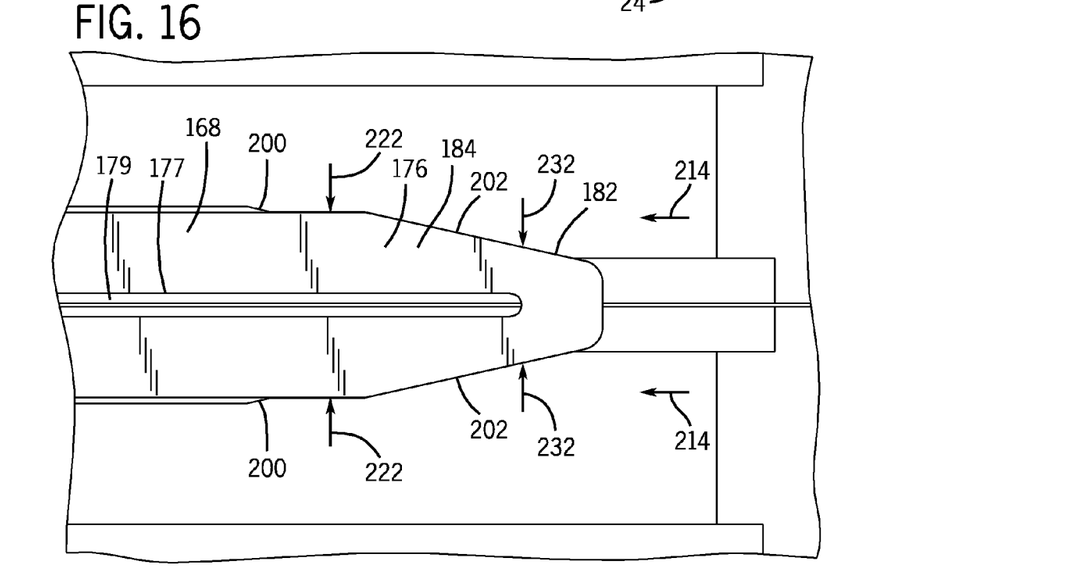
FIG. 16 is schematic diagram of an embodiment of the split gate valve of FIG. 15, taken within line 16-16 of FIG. 14, illustrating the expansion bar engaging the first portion and a second portion of the slot along the pair of gate sections with the pair of gate sections in a closed position.
Figure 17:
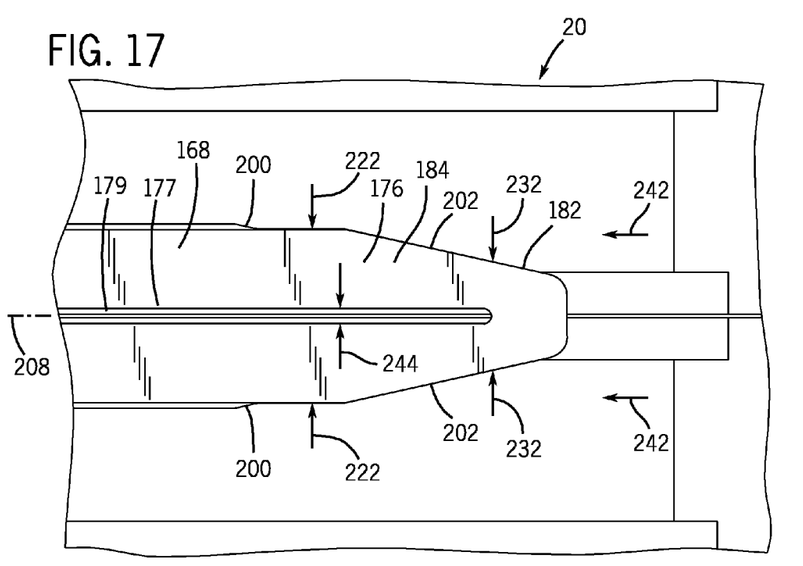
FIG. 17 is a schematic diagram of an embodiment of the split gate valve of FIG. 16, illustrating the expansion bar moved beyond the closed position of FIG. 16, causing a spring mechanism (e.g., groove) of the expansion bar to partially compress to prevent buckling of the expansion bar.

FIGS. 15-17 describe the interaction between the tapered end 184 of the expansion bar 168 and the slot 182 as the gate 20 moves from the open position to the closed position as indicated by arrows 214. FIG. 15 is a schematic diagram of an embodiment of the expansion bar 168 engaging the first portion 200 of the slot 182 formed between the gate sections 22 and 24 as the gate sections 22 and 24 move 214 toward the closed position. As illustrated, when the gate sections 22 and 24 move 214 toward the closed position, the tapered end 184 of the expansion bar 168 first engages the first portion 200 of the slot 182. The engagement of the first portion 200 of the slot 182 with the tapered end 184 of the expansion bar 168 energizes the expansion bar 168. In addition, this engagement forms an interference fit, as indicated by arrows 222, between the tapered end 184 of the expansion bar 168 and the slot 182. For example, as the tapered end 184 of the expansion bar 168 gradually fills and exceeds the width of the slot 182 along portions 200 of the slot 182 (e.g., the interference fit), the tapered end 184 gradually increases the biasing force in opposite directions to bias the gate sections 22 and 24 away from one another. In response to this biasing force, the gate sections 22 and 24 gradually move apart to seal against the opposite seats 54 of the split gate valve 10. As discussed above, the first portion 200 has an angle 206 (see FIG. 11), which may be equal, less than, or greater than angle 210 of the second portion 202. The angle 206 defines a first or initial rate of expansion between the gate sections 22 and 24 as the gate 20 moves 214 toward the closed position.

FIG. 16 is schematic diagram of an embodiment of the expansion bar 168 engaging the first and second portions 200 and 202 of the slot 182 formed between the pair of gate sections 22 and 24 with the pair of gate sections 22 in the closed position, taken within line 16-16 of FIG. 14. As illustrated, as the gate sections 22 and 24 continue to move 214 toward the closed position, the tapered end 184 of the expansion bar 168 engages the second portion 202 of the slot 182. The second portion 202 has the angle 210 (see FIG. 11) to define the second rate of expansion between the gate sections 22 and 24 as the gate 20 moves 214 toward the closed position. Again, the angle 210 may be equal, less than, or greater than the angle 206. Therefore, the second rate of expansion along the second portion 202 of the slot 182 may be equal, greater than, or less than the first rate of expansion. In reaching the closed position, the tapered end 184 biases the gate sections 22 and 24 away from one another. The engagement of the second portion 202 of the slot 182 with the tapered end 184 of the expansion bar 168 forms an interference fit, as indicated by arrows 232, between the tapered end 184 and the slot 128 to further bias the gate sections 22 and 24 away from one another in addition to the bias provided by the first portion 200 with the tapered end 184. In response to this biasing force, the gate sections 22 and 24 gradually move apart to seal against the opposite seats 54 of the split gate valve 10.

In certain situations, the split gate valve 10 may be overstroked (e.g., overextended) resulting in the gate 20 moving beyond the closed position. FIG. 17 is a schematic diagram of an embodiment of the expansion bar 168 engaging the first and second portions 200 and 202 of the slot 182 formed between the pair of gate sections 22 and 24, illustrating the gate 20 moved beyond the closed position. FIG. 17 is as described in FIG. 16 except for the state of the spring mechanism 177 (e.g., groove 179). In response to the gate 20 being moved beyond the closed position, the spring mechanism 177 compresses to prevent buckling of the expansion bar 168. As illustrated in FIG. 17, the spring mechanism 177 is narrower than in FIGS. 15 and 16 due to axial forces 242 applied to the tapered end 184 of the expansion bar 168, as the gate 20 moves beyond the closed position. As the axial forces 242 engage the tapered end 184, the forces 242 impart opposite lateral forces 244 inwardly against the spring mechanism 177 (e.g., groove 179). Thus, the expansion bar 168 compresses laterally (e.g., crosswise to axis 208). By acting as a spring, the spring mechanism 177 absorbs the additional force preventing damage to expansion bar 168, still enabling the expansion bar 168 to bias the gate sections 22 and 24 away from one another to seal against the opposite seats 54 of the split gate valve 10. In certain embodiments, a width 246 of the groove 179 may be compressed to approximately 0 to 100, 5 to 90, to 80, 20 to 70, 30 to 60, or 40 to 50 percent of its original width 246 as a result of the forces 242 and 244.

Figure 18:
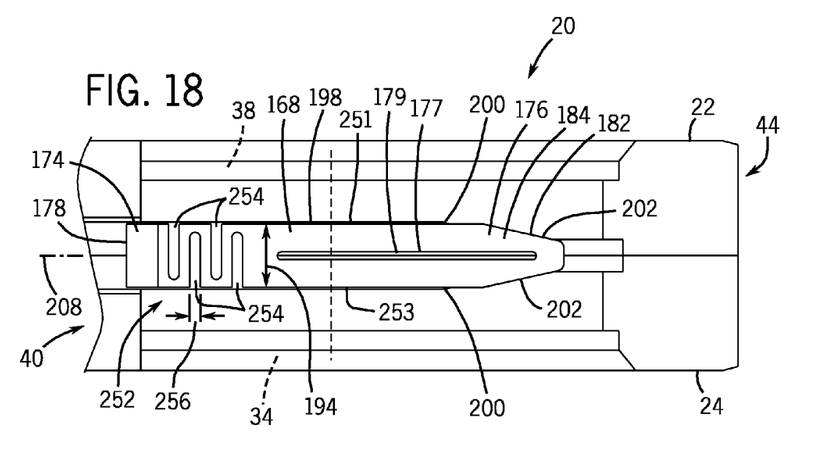
FIG. 18 is a schematic diagram of an embodiment of the split gate valve of FIGS. 9-17, illustrating an expansion bar disposed along a slot in the pair of gate sections in a closed position, wherein the expansion bar has a spring mechanism with a lengthwise groove and crosswise slots.

Besides the spring mechanism 177 disposed along a portion of the length of the expansion bar 168 between the first and second ends 174 and 176, the expansion bar 168 may include additional or alternative spring mechanisms. FIG. 18 is a schematic diagram of an embodiment of the expansion bar 168 having a spring mechanism 252 at an attached end (e.g., first end 174) with the expansion bar 168 engaging the first and second portions 200 and 202 of the slot 182 formed between the pair of gate sections 22 and 24 with the pair of gate sections 22 and 24 in the closed position. The gate 20 and the expansion bar 168 are as described in FIG. 14 except the expansion bar 168 includes the spring mechanism 252. The spring mechanism 252 is disposed between the first end 174 of the expansion bar 168 and the spring mechanism 177 (e.g., groove 179). The spring mechanism 252 is configured to compress upon forcing the gate 20 (i.e., gate sections 22 and 24) to move beyond the closed position, thereby preventing buckling of the expansion bar 168. As illustrated, the spring mechanism 252 includes a plurality of slots 254 in a staggered arrangement along the longitudinal axis 208 of the expansion bar 168. The slots 254 compress axially (e.g., lengthwise along axis 208), whereas the groove 179 compresses laterally (e.g., crosswise to axis 208). The slots 254 may be oriented crosswise (e.g. perpendicular) to the longitudinal axis 168. The slots 154 extend across a portion of the width 194 of the expansion bar 168 from sides 251 and 253 of the expansion bar 168. The number of slots 254 may range from 2 to 20, 2 to 10, or 2 to 6. For example, the expansion bar 168 may include 2, 3, 4, 5, 6, 7, 8, 9, 10, 11, 12, 13, 14, 15, 16, 17, 18, 19, or 20 slots 254. Each of the slots 254 includes a width 256. In certain embodiments, the width 256 of the slots 254 may be the same. In other embodiments, the width 256 of slots 254 may vary between one another.

Figure 19:
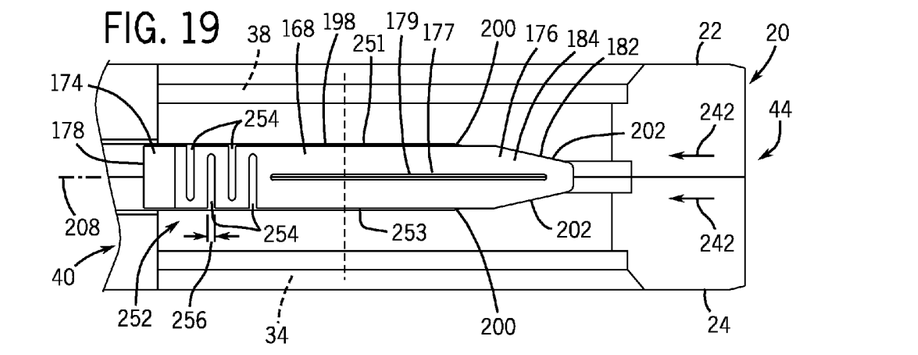
FIG. 19 is a schematic diagram of an embodiment of the split gate valve of FIG. 18, illustrating the expansion bar moved beyond the closed position of FIG. 18, causing the spring mechanism (e.g., groove and slots) to partially compress to prevent buckling of the expansion bar.

As mentioned above, in certain situations, the split gate valve 10 may be overstroked resulting in the gate 20 moving beyond the closed position. FIG. 19 is a schematic diagram of an embodiment of the expansion bar 168 in FIG. 18 engaging the first and second portions 200 and 202 of the slot 182 formed between the pair of gate sections 22 and 24, illustrating the pair of gate sections 22 and 24 moved beyond the closed position. FIG. 19 is as described in FIG. 18 except for the state of the spring mechanism 252 (e.g., slots 254). As mentioned above, in response to the gate 20 being moved beyond the closed position, the spring mechanism 177 compresses to prevent buckling of the expansion bar 168. Similarly, the spring mechanism 177 compresses to prevent buckling of the expansion bar 168. As a result, the width 256 of the slots 254 narrows in response to the axial forces 242 applied to the expansion bar 168 due to moving the gate 20 beyond the closed position. In certain embodiments, the width 256 of each slot 254 may be compressed to approximately 0 to 100, 5 to 90, 10 to 80, 20 to 70, 30 to 60, or 40 to 50 percent of its original width 256. By acting as a spring, the spring mechanism 252 absorbs the additional force due to overstroking (e.g., overextending) the split gate valve 10 and prevents damage to the expansion bar 168.

Figures 20, 21, 22, 23:
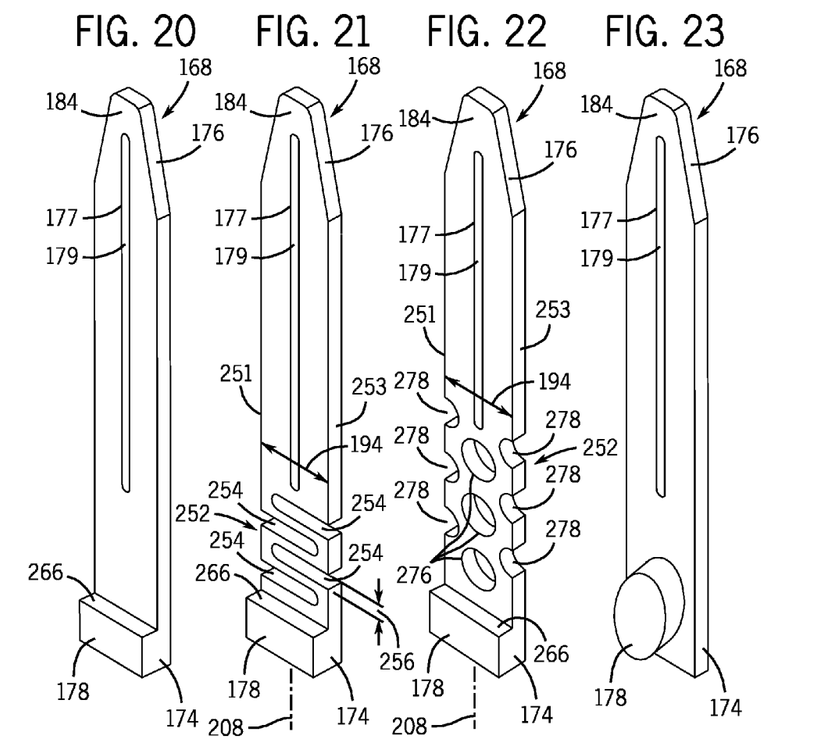
FIG. 20 is a perspective view of an embodiment of an expansion bar having a tapered end, a protruding mount (e.g., rectangular lip), and a spring mechanism with a single lengthwise groove.
FIG. 21 is a perspective view of an embodiment of an expansion bar having a tapered end, a protruding mount, and a spring mechanism with a lengthwise groove and crosswise slots in a staggered configuration.
FIG. 22 is a perspective view of an embodiment of an expansion bar having a tapered end, a protruding mount, and a spring mechanism with a lengthwise groove, lateral notches, and orifices.
FIG. 23 is a perspective view of an embodiment of an expansion bar having a tapered end, a protruding mount (e.g., cylindrical shaft), and a spring mechanism with a single lengthwise groove.

FIGS. 20-23 illustrate different embodiments of the expansion bar 168, which are each configured to bias the gate sections 22 and 24 away from one another upon moving the gate 20 to the closed position. The different features of the embodiments of the expansion bars 168 described below may be used in any combination with one another. Each expansion bar 168 includes the first end 174 having the protruding end 178 and the second end having the tapered end 178, and the spring mechanism 177 (e.g., groove 179) as described above. FIG. 20 is a perspective view of an embodiment of the expansion bar 168 having a single spring mechanism 177 (e.g., groove 179). As mentioned above, the spring mechanism 177 is configured to compress (e.g., groove 179 narrows) upon moving the gate 20 (e.g., gate sections 22 and 24) into and beyond the closed position, thereby preventing buckling of the expansion bar 168. In addition, the protruding end 178 of the expansion bar 168 includes a lip 266 configured to engage the body 18 of the split gate valve 10 to maintain the expansion bar 168 in a stationary position relative to the pair of gate sections 22 and 24. For example, the lip 266 may rest in the retention recess 180 of the body 18.

Alternatively, the expansion bar 168 may include more than one spring mechanism. FIG. 21 is a perspective view of an embodiment of the expansion bar 168 having multiple spring mechanisms 177 and 252 (e.g., groove 179 and slots 254, respectively). As mentioned above, the spring mechanism 252 is disposed between the first end 174 of the expansion bar 168 and the spring mechanism 177 (e.g., groove 179). The spring mechanism 252 is configured to compress (e.g., slots 254 narrow) upon moving the gate 20 (i.e., gate sections 22 and 24) into and beyond the closed position, thereby preventing buckling of the expansion bar 168. As illustrated, the spring mechanism 252 includes the plurality of slots 254 in a staggered arrangement along the longitudinal axis 208 of the expansion bar 168. The slots 154 extend across a portion of the width 194 of the expansion bar 168 from sides 251 and 253 of the expansion bar 168. The number of slots 254 may range from 2 to 20, 2 to 10, or 2 to 6. For example, the expansion bar 168 may include 2, 3, 4, 5, 6, 7, 8, 9, 10, 11, 12, 13, 14, 15, 16, 17, 18, 19, or 20 slots 254. Each of the slots 254 has the width 256. In certain embodiments, the width 256 of the slots 254 may be the same. In other embodiments, the width 256 of slots 254 may vary between one another. In addition, the expansion bar 168 includes the lip 266 as described above.

FIG. 22 is a perspective view of an embodiment of the expansion bar 168 having multiple spring mechanisms 177 and 252 (e.g., groove 179, orifices 276, and notches 278). The spring mechanism 252 is disposed between the first end 174 of the expansion bar 168 and the spring mechanism 177 (e.g., groove 179). The spring mechanism 252 is configured to compress upon moving the gate 20 (i.e., gate sections 22 and 24) into and beyond the closed position, thereby preventing buckling of the expansion bar 168. As illustrated, the spring mechanism 252 includes a plurality of orifices 276 aligned along the longitudinal axis 208 between the sides 251 and 253 of the expansion bar 168. The number of orifices 276 may range from 1 to 10. For example, the expansion bar 168 may include 1, 2, 3, 4, 5, 6, 7, 8, 9, 10, or any other number of orifices 276. The size of each orifice 276 may be the same or vary between one another. The spring mechanism 252 also includes a plurality of notches 278 arranged between the plurality of orifices 276. In certain embodiments, the plurality of notches 278 may be aligned with the plurality of orifices 276. The notches 278 extend across a portion of the width 194 from the sides 251 and 253 of the expansion bar 168. The number of notches 278 may range from 2 to 20, 2 to 10, or 2 to 6. For example, the expansion bar 168 may include 2, 3, 4, 5, 6, 7, 8, 9, 10, 11, 12, 13, 14, 15, 16, 17, 18, 19, or 20 notches 278. As illustrated, the notches 278 include a curved notch. In some embodiments, the shape of the notch 278 may include a square notch, wedge-shaped notch, rectangular shaped notch, or any other shape, or any combination of shapes thereof. The plurality of orifices 276 and the plurality of notches 278 shrink or compress upon moving the gate 20 (e.g., gate sections 22 and 24) into and beyond the closed the closed position, thereby preventing buckling of the expansion bar 168. In addition, the expansion bar 168 includes the lip 266 as described above.

The expansion bar 168 may also include an alternative protruding end 178. FIG. 23 is a perspective view of an embodiment of the expansion bar 168 having a cylindrical configuration of the protruding end 178. The expansion bar 168 includes a single spring mechanism 177 (e.g., groove 179). As mentioned above, the spring mechanism 177 is configured to compress upon moving the gate 20 (e.g., gate sections 22 and 24) into and beyond the closed position, thereby preventing buckling of the expansion bar 168. In addition, the protruding end 178 of the expansion bar 168 includes a cylindrical protrusion 288, such as a pin or bolt, configured to engage the body 18 of the split gate valve 10 to maintain the expansion bar 168 in a stationary position relative to the pair of gate sections 22 and 24. For example, the cylindrical protrusion 288 may rest on or in the retention recess 180 of the body 18. Alternatively, the cylindrical protrusion 288 may be inserted within a hole of the body 18 or bonnet 19. In certain embodiments, protrusion 288 may include an alternative cross-sectional shape including a triangular, square, rectangular, or any other shape.

As discussed above, the disclosed embodiments include the split gate valve 10 that includes the pair of gate sections 22 and 24 (e.g., slab gates) coupled together and configured to move together within the cavity 26 of the split gate valve 10 between open and closed positions. The split gate valve 10 includes the rolling actuator 12 to reduce the amount of mechanical force or torque required to move the split gate between the open and closed positions in large bore and/or high pressure valves. In addition, the gate sections 22 and 24 form a double seal against the seat of 54 of the split gate valve 10. Further, the split gate valve 10 includes one or more expansion bars 168 to bias the gate sections 22 and 24 away from one another via slots 182 formed on the gate 20, as the gate 20 moves toward the closed position. The expansion bars 168 may include one or more spring mechanisms configured to compress upon moving the gate 20 into and beyond the closed position to prevent buckling of the expansion bars 168. The pair of gate sections 22 and 24 also enables the split gate valve 10 to control flows of two different fluids with each gate section 22 and 24. In addition, the double seal enables the isolation of a fluid within the cavity 26 of the split gate valve 10. Further, the double seal enables testing of each seal at the same time by filling the cavity of the split gate valve 10 with a fluid. In certain embodiments, the body 18 of the split gate valve 10 includes a rectangular opening configured to tightly fit the gate 20 allowing a reduction in size of the body 18, thus, minimizing the amount of deflection experienced by the split gate valve 10 under load pressure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
a split gate valve, comprising:
first and second gate sections coupled together and configured to move together within a cavity of the split gate valve between an open position and a closed position;
a rolling actuator configured to reduce friction and to convert a rotational input into a linear motion to move the first and second gate sections between the open and closed positions; and at least one expansion bar configured to bias the first and second gate sections away from one another to seal against opposite seats of the split gate valve, wherein each expansion bar of the at least one expansion bar comprises a spring section configured to compress upon moving the first and second gate sections into and beyond the closed position to prevent buckling of the respective expansion bar.

2. The system of claim 1, wherein the first and second gate sections form a slot configured to engage each expansion bar of the at least one expansion bar as the first and second gate sections move from the open position to the closed position.

3. The system of claim 2, wherein the slot comprises a first portion that tapers at a first angle relative to a longitudinal axis of the split gate valve, and each expansion bar of the at least one expansion bar comprises a tapered end configured to bias the first and second gate sections away from one another as the tapered end engages the first portion of the slot.

4. The system of claim 3, wherein the slot comprises a second portion offset from the first portion along the longitudinal axis, the second portion tapers at a second angle relative to the longitudinal axis, and the tapered end of each expansion bar of the at least one expansion bar is configured to bias the first and second gate sections away from one another as the tapered end engages the second portion of the slot.

5. The system of claim 4, wherein the first angle equals the second angle.

6. The system of claim 4, wherein the first angle is different from the second angle.

7. The system of claim 1, wherein the split gate valve comprises a body, and each expansion bar of the at least one expansion bar comprises a protruding end configured to engage the body to maintain the respective expansion bar in a stationary position as the first and second gate sections move between the open and closed positions.

8. The system of claim 1, wherein each expansion bar of the at least one expansion bar comprises a first end and a second end, the spring section comprises a first spring section having a groove disposed along a portion of a length of the respective expansion bar between the first and second ends, and the groove is configured to compress upon moving the first and second gate sections into and beyond the closed position to prevent buckling of the respective expansion bar.

9. The system of claim 8, wherein the spring section comprises a second spring section disposed between the first end and the groove of each expansion bar of the at least one expansion bar, and second spring section is configured to compress upon moving the first and second gate sections into and beyond the closed position to prevent buckling of the respective expansion bar.

10. The system of claim 9, wherein second spring section comprises a plurality of slots.

11. The system of claim 9, wherein the second spring section comprises a plurality of notches, a plurality of orifices, or a combination thereof.

12. The system of claim 1, wherein the at least one expansion bar comprises a first expansion bar and a second expansion bar, the first and second expansion bars each having at least one spring section configured to compress upon moving the first and second gate sections into and beyond the closed position to prevent buckling of the first and second expansion bars.

13. The system of claim 1, wherein the at least one expansion bar itself is compressible via the spring section.

14. A system, comprising:
a split gate valve, comprising:
first and second gate sections coupled together and configured to move together within a cavity of the split gate valve between an open position and a closed position; and
at least one expansion bar configured to bias the first and second gate sections away from one another to seal against opposite seats of the split gate valve, wherein each expansion bar of the at least one expansion bar comprises a spring section that is compressible, and the spring section is disposed between and offset from opposite first and second ends of the respective expansion bar.

15. The system of claim 14, wherein the first and second gate sections form a slot configured to support each expansion bar of the at least one expansion bar as the first and second gate sections move from the open position to the closed position, and the respective expansion bar is configured to wedgingly engage the slot upon moving the first and second gate sections into the closed position.

16. The system of claim 14, wherein the spring section is configured to compress upon moving the first and second gate sections into and beyond the closed position to prevent buckling of each expansion bar of the at least one expansion bar.

17. The system of claim 16, wherein each expansion bar of the at least one expansion bar comprises a groove extending lengthwise along a portion of a length of the respective expansion bar between and offset from the opposite first and second ends of the respective expansion bar, and the groove is configured to compress upon moving the first and second gate sections into and beyond the closed position to prevent buckling of the respective expansion bar.

18. The system of claim 16, wherein the spring section comprises a plurality of slots extending crosswise to a longitudinal axis of each expansion bar of the at least one expansion bar, and the plurality of slots are configured to compress upon moving the first and second gate sections into and beyond the closed position to prevent buckling of the respective expansion bar.

19. The system of claim 14, wherein the at least one expansion bar comprises a first expansion bar and a second expansion bar, the first and second expansion bars each having at least one spring section configured to compress upon moving the first and second gate sections into and beyond the closed position to prevent buckling of the first and second expansion bars.

20. The system of claim 14, wherein the at least one expansion bar itself is compressible via the spring section.

21. A system, comprising:
at least one expansion bar configured to bias first and second gate sections of a split gate valve away from one another to seal against opposite seats of the split gate valve as the first and second gates move together within a cavity of the split gate valve between an open position and a closed position, wherein each expansion bar of the at least one expansion bar comprises a spring section configured to compress upon moving the first and second gate sections into and beyond the closed position to prevent buckling of the respective expansion bar.

22. The system of claim 21, comprising the split gate valve having the first and second gate sections coupled together and configured to move together within the cavity of the split gate valve between the open position and the closed position, the first and second gate sections form a slot configured to support each expansion bar of the at least one expansion bar as the first and second gate sections move from the open position to the closed position, and the respective expansion bar is configured to wedgingly engage the slot upon moving the first and second gate sections into the closed position.

23. The system of claim 21, wherein the spring section comprises one or more slots extending crosswise to a longitudinal axis of the respective expansion bar.

24. The system of claim 21, wherein the spring section enables compression of the at least one expansion bar in a longitudinal direction or a crosswise direction relative to an axis of the at least one expansion bar.

25. The system of claim 21, wherein the at least one expansion bar itself is compressible via the spring section.

* * * * *